(12) United States Patent
Kataza et al.

(10) Patent No.: US 9,381,482 B2
(45) Date of Patent: Jul. 5, 2016

(54) LINING STRUCTURE

(71) Applicant: SUMITOMO METAL MINING CO., LTD., Tokyo (JP)

(72) Inventors: Seiichiro Kataza, Tokyo (JP); Tomoyuki Hirose, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/891,872

(22) PCT Filed: Feb. 12, 2014

(86) PCT No.: PCT/JP2014/053130
§ 371 (c)(1),
(2) Date: Nov. 17, 2015

(87) PCT Pub. No.: WO2014/203557
PCT Pub. Date: Dec. 24, 2014

(65) Prior Publication Data
US 2016/0129412 A1    May 12, 2016

(30) Foreign Application Priority Data
Jun. 18, 2013 (JP) ................................. 2013-127541

(51) Int. Cl.
*B01J 3/02* (2006.01)
*B01J 4/00* (2006.01)
*B01J 19/02* (2006.01)

(52) U.S. Cl.
CPC .. *B01J 3/02* (2013.01); *B01J 4/001* (2013.01); *B01J 19/02* (2013.01); *B01J 2219/0236* (2013.01)

(58) Field of Classification Search
CPC .............. B01J 3/02; B01J 4/001; B01J 19/02; B01J 2219/0236
See application file for complete search history.

(56) References Cited

U.S. PATENT DOCUMENTS 2,216,033 A * 9/1940 Hopkins .............. B23K 9/0026
219/137 R
2003/0201037 A1    10/2003 Totino et al.

FOREIGN PATENT DOCUMENTS

JP    S58-53955 U    4/1983
JP    S62-267405 A    11/1987
(Continued)

OTHER PUBLICATIONS

May 13, 2014 International Search Report issued in International Patent Application No. PCT/JP2014/053130.

*Primary Examiner* — Lessanework Seifu
(74) *Attorney, Agent, or Firm* — Oliff PLC

(57) ABSTRACT

Damage of a lining-member is prevented through mitigation of stress concentration due to difference in thermal expansion. A lining-structure of a lining-member is provided on a base material of an insertion tube for adding a chemical to a reaction vessel for leaching under high temperature and high pressure. The base material has tube and flange sections. The lining-member is provided on the base material and formed of different material from the base material, and has a tube-lining section provided on the tube and flange lining sections provided on the flange-section. A chamfer-section is formed on the flange-section. The tube-lining section is protruded to the same height as a flat surface of the flange lining section. The flange lining-section has a curved surface-section protruded toward the base material side on the chamfer-section and is welded to a protruding-section of the tube-lining section that protrudes from a slant surface of the chamfer-section.

3 Claims, 4 Drawing Sheets

(56) References Cited

FOREIGN PATENT DOCUMENTS

| JP | 2003-254478 A | 9/2003 |
|----|---------------|--------|
| JP | 2007-224980 A | 9/2007 |
| JP | 2008-508100 A | 3/2008 |
| JP | 2008-128255 A | 6/2008 |
| JP | 2010-221216 A | 10/2010 |
| JP | 2011-174493 A | 9/2011 |

* cited by examiner

LINING STRUCTURE

BACKGROUND OF THE INVENTION

1. Field of the Invention

The present invention relates to a lining structure which is effective for a measure against damage of a lining member due to a difference in thermal expansion under high temperature and high pressure. The lining member is provided on a metal base material of an insertion tube for adding a chemical used for adding a chemical to a reaction vessel for leaching under high temperature and high pressure. The present application claims priority as a basis for Japanese Patent Application No. 2013-127541 filed in Japan on Jun. 18, 2013, and this application is incorporated herein by reference.

2. Description of Related Art

Conventionally, as disclosed in Patent Literature 1, there is a technique in which a lining member is provided within a tube to prevent leakage of fluid of high temperature or high pressure, or to protect the tube from corrosion, wear, contamination, or the like.

Based on such a technique, as illustrated in FIG. 3, for example, in a nickel hydrometallurgical process using a high pressure sulfuric acid leaching process, a lining member 120 is provided on a base material member 110 of an insertion tube 103 for adding a chemical used for adding an acidic chemical to an autoclave 102, and a metal lining is applied by the lining member 120.

As illustrated in FIG. 4, the base material member 110 has, for example, a cylindrical tube section 111 and a flange section 112 that protrudes outward at one end of the tube section 111, and is formed of a metal base material, such as Ti (titanium). The lining member 120 has, for example, a cylindrical tube section lining section 121 provided on an inner surface 111a of the tube section 111 of the base material member 110 and a disc-shaped flange lining section 122 provided on the flange section 112 of the base material member 110, and is formed of a lining material, such as Ta (tantalum).

The lining material of the flange lining section 122 is explosively welded to the flange section 112 of the flat base material member 110, and the flange lining section 122 is joined to the tube section lining section 121 by welding. Moreover, generally, such a conventional insertion tube 103 for adding a chemical has a structure that the tube section lining section 121 and the flange lining section 122 are joined substantially orthogonally.

The autoclave 102 is in a predetermined high temperature and high pressure state during operation. However, during periodic inspection, repair, or the like, the temperature and even the atmospheric pressure of the autoclave 102 are lowered, and the autoclave 102 is in a normal temperature and normal pressure state. Accordingly, a difference in thermal expansion occurs between the base material member 110 and the lining member 120 that normally have a difference in coefficients of thermal expansion. Moreover, it is structured that the flange lining section 122 is explosively welded to the flange section 112 of the base material member 110 and is joined to the tube section lining section 121 by welding, and that the tube section lining section 121 and the flange lining section 122 are joined substantially orthogonally. Consequently, it is structured that stress due to the difference in thermal expansion is concentrated on the flange lining section 122.

Incidentally, when the metal base material is Ti (titanium), a coefficient of thermal expansion thereof is approximately 8 to 9 $\mu m \cdot m^{-1} \cdot K^{-1}$, and when the lining material is Ta (tantalum), a coefficient of thermal expansion thereof is approximately 6 to 7 $\mu m \cdot m^{-1} \cdot K^{-1}$. The coefficient of thermal expansion of the lining member 120 is smaller than that of the base material member 110 by about 30 percent.

Therefore, when the insertion tube 103 for adding a chemical is thermally expanded under high temperature and high pressure, the lining member 120 having a smaller coefficient of thermal expansion cannot absorb the expansion of the flange section 112, and a crack occurs in the lining member 120. Accordingly, there is a possibility that the base material member 110 of the insertion tube 103 for adding a chemical and a nozzle section of the autoclave 102 are damaged.

When this is left alone, the damage is progressed to an extent that an inside and an outside of the autoclave 102 are communicated with each other. As a result, high pressure steam and a chemical are jetted out from the autoclave 102 and a situation becomes seriously dangerous. Besides that, since it is necessary to stop operation and perform replacement and repair work of various members, production efficiency is significantly reduced.

PRIOR ART

Patent Document

Patent document 1: Japanese Laid-Open Patent Publication 2008-128255

BRIEF SUMMARY OF THE INVENTION

The present invention is made to solve such a situation, and an object thereof is to provide a lining structure capable of mitigating stress concentration due to a difference in thermal expansion and preventing damage of a lining member.

A lining structure according to the present invention is a lining structure of a lining member provided on a base material of an insertion tube used for adding a chemical to a reaction vessel for leaching under high temperature and high pressure, wherein the base material has a tube section and a flange section, the lining member is provided on the base material and formed of a material different from the base material, and the lining member has a tube section lining section provided on the tube section and a flange lining section provided on the flange section, a chamfer section is formed on the flange section, the tube section lining section is protruded to the same height as a flat surface of the flange lining section, and the flange lining section has a curved surface section protruded toward the base material side on the chamfer section and is welded to a protruding section of the tube section lining section that protrudes from a slant surface of the chamfer section.

Further, when a width from a part of the flange section abutting an inner surface of the tube section to the flange section is W, a width range of the chamfer section may be within a range from 1/4 W to 1/2 W, and when a thickness of the flange section is D, a depth range of the chamfer section may be within a range from 1/3 D to 1/2 D.

Further, by adding an acidic chemical to the reaction vessel, the reaction vessel can be used suitably as a vessel at least leaching nickel from nickel oxide ore slurry.

In the present invention, a chamfer width of a corner section of a flange section is increased by providing a chamfer section at the flange section of a base material, a tube section lining section of the lining member is protruded to the same height as a flat upper surface of a flange lining section, and further, bending work is applied to the flange lining section of the lining member. Accordingly, even when an insertion tube is thermally expanded under high temperature and high pressure, the lining member can follow the expansion and can absorb a difference in thermal expansion even in a reaction under the high temperature and high pressure, and damage of the lining member can be prevented. Therefore, according to the present invention, it is possible to suppress a risk of jetting out high pressure steam or a chemical and a risk, such as a loss caused by stopping a production facility due to replacement work or repair work of the insertion tube for adding a chemical accompanied by the damage of the lining member. Further, according to the present invention, since explosive welding is not needed, a manufacturing process can be simplified.

DETAILED DESCRIPTION OF THE INVENTION

Hereinafter, a lining structure according to the present invention will be described with reference to the drawings. Incidentally, the present invention should not be limited to the following examples and can be arbitrarily changed in a range not deviating from the gist of the present invention. Further, description will be given in the following order.

1. Description of Overall Configuration of Lining Structure
2. Description of Effects of Lining Structure
3. Description of Variation of Lining Structure

[1. Description of Overall Configuration of Lining Structure]

Figure 1:
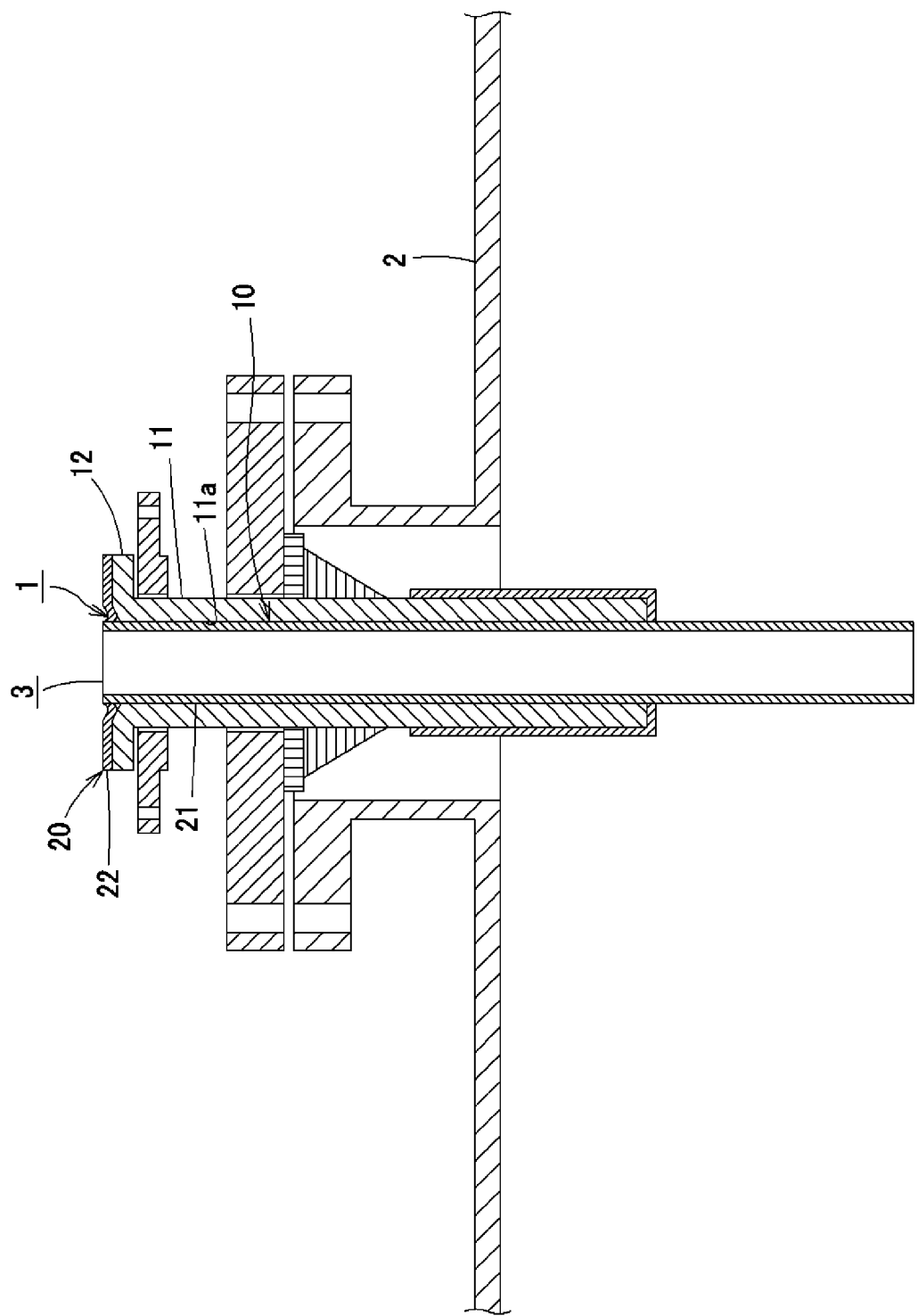
FIG. 1 is a sectional view illustrating an insertion tube for adding a chemical.

As illustrated in FIG. 1, for example, a lining structure 1 according to the present invention prevents occurrence of a crack in a lining member 20, the lining member 20 serving as a lining and being provided on a base material member 10 of an insertion tube 3 for adding a chemical used for adding an acidic chemical to a reaction vessel 2, e.g., an autoclave, for leaching nickel or cobalt from nickel oxide ore slurry under high temperature and high pressure in a nickel hydrometallurgical process or the like using a high pressure sulfuric acid leaching process.

Figure 2:
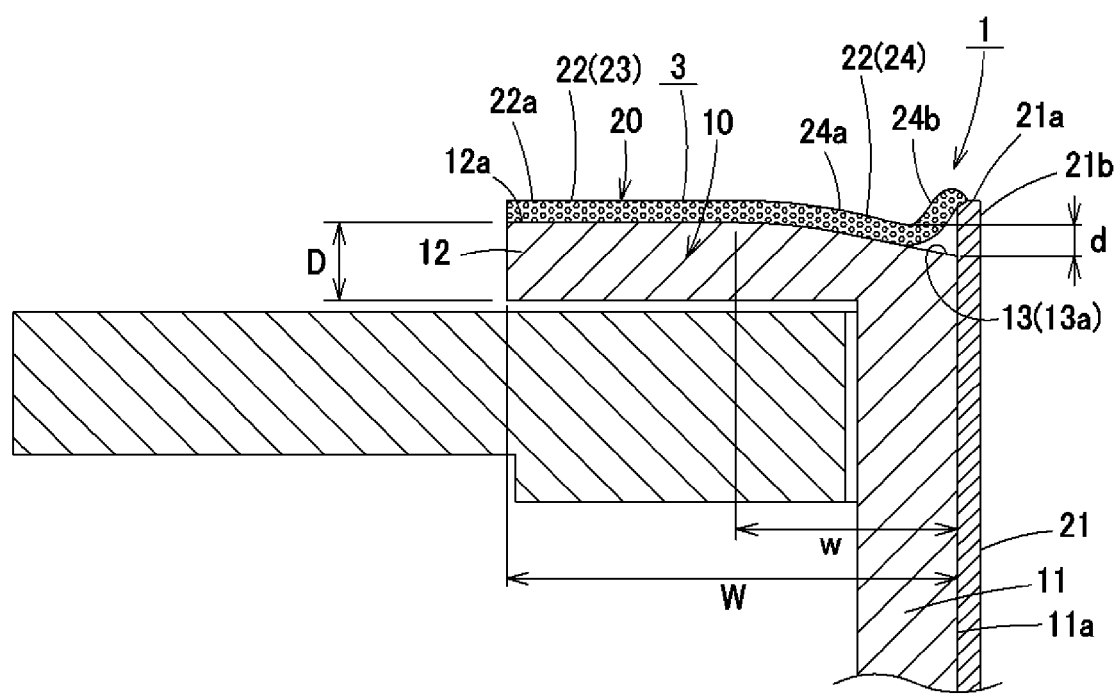
FIG. 2 is a sectional view illustrating a lining structure to which the present invention is applied.

Specifically, as illustrated in FIG. 2, the insertion tube 3 for adding a chemical has a base material member 10 and a lining member 20 provided on the base material member 10 and serves as the lining.

The base material member 10 has a cylindrical tube section 11 and a flange section 12 that protrudes outward at one end of the tube section 11, and is formed of a metal base material, such as Ti (titanium). The flange section 12 is formed into a planar shape and formed with a chamfer section 13 provided in a slanted manner so as to become gradually thin toward an inner side (a tube section 11 side) at a corner on the inner side (the tube section 11 side). In other words, the flange section 12 has a smooth flat section 12*a* and a chamfer section 13.

The lining member 20 has a cylindrical tube section lining section 21 provided on an inner surface 11*a* of the tube section 11 of the base material member 10 and a disc-shaped flange lining section 22 provided on the flange section 12 of the base material member 10, and is formed of a lining material, such as Ta (tantalum). Further, the tube section lining section 21 and the flange lining section 22 are integrated via the lining structure 1.

Specifically, the tube section lining section 21 is provided that one end section 21*a* has substantially the same height as a flat upper surface 22*a* of the flange lining section 22. Further, the flange lining section 22 is provided along an upper surface of the flange section 12. Specifically, the flange lining section 22 has a flat section 23 provided along the flat section 12*a* of the flange section 12 and a U-shaped or V-shaped curved surface section 24 bent toward a flange section 12 side (a lower side) and protruded on an inner side (a tube section lining section 21 side) of the flat section 23. Further, the curved surface section 24 has a first curved surface section 24*a* provided along the chamfer section 13 and a second curved surface section 24*b* disposed over between the chamfer section 13 and a protruding section 21*b*. The protruding section 21*b* protrudes from a slant surface 13*a* of the chamfer section 13 on one end side of the tube section lining section 21. An end on the inner side (the tube section lining section 21 side) of the second curved surface section 24*b* is welded to the one end section 21*a* or the protruding section 21*b* of the tube section lining section 21, and the second curved surface section 24*b* is integrally provided with the tube section lining section 21.

The tube section lining section 21 and the flange lining section 22 are integrally provided by the above-described lining structure 1. Further, the tube section lining section 21 and the flange lining section 22 are integrally provided by the lining structure 1, and the lining member 20, to which bending work has been applied, is installed in the base material member 10 by welding or the like and not by conventional explosive welding.

Figure 3:
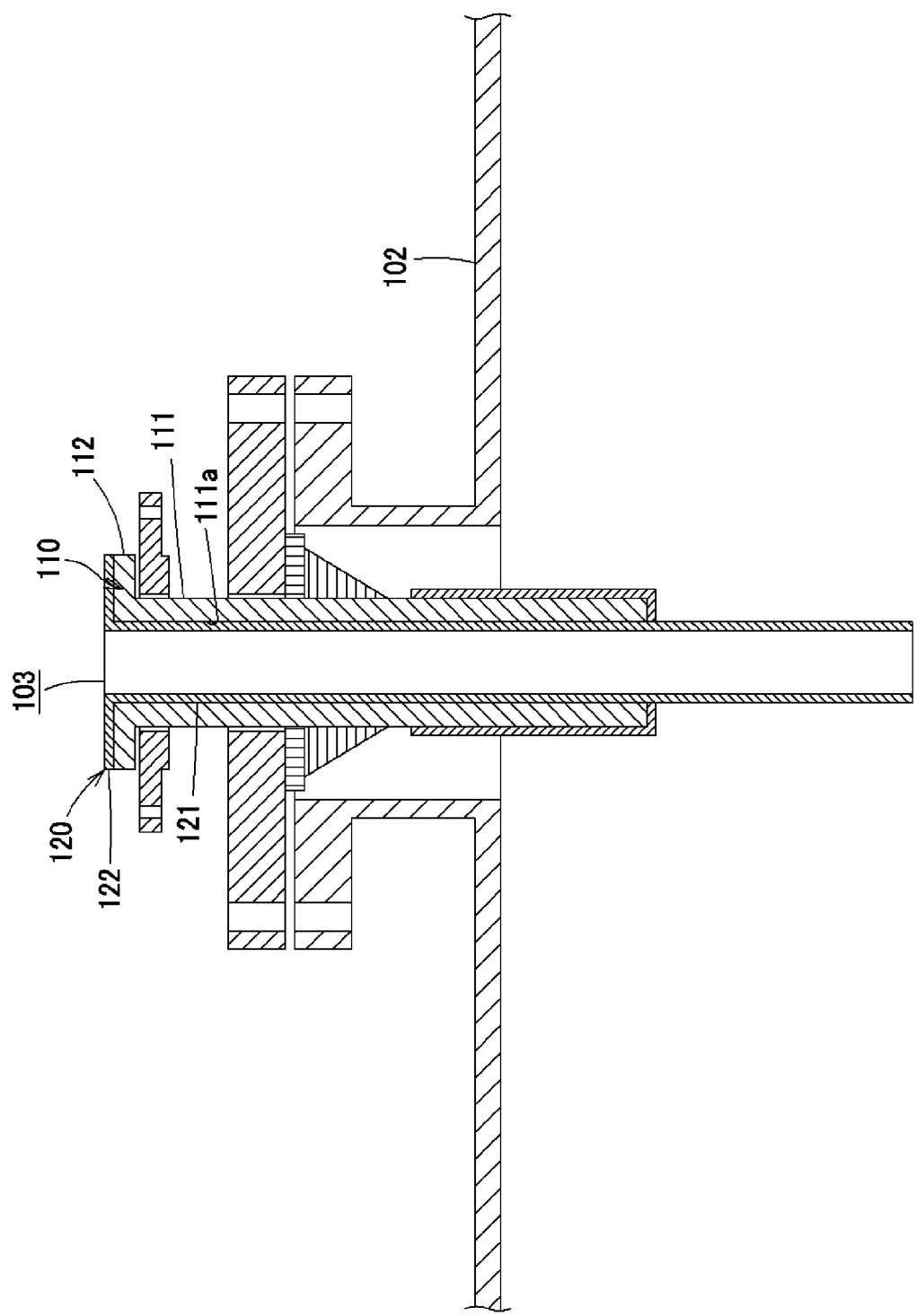
FIG. 3 is a sectional view illustrating a conventional insertion tube for adding a chemical.
Figure 4:
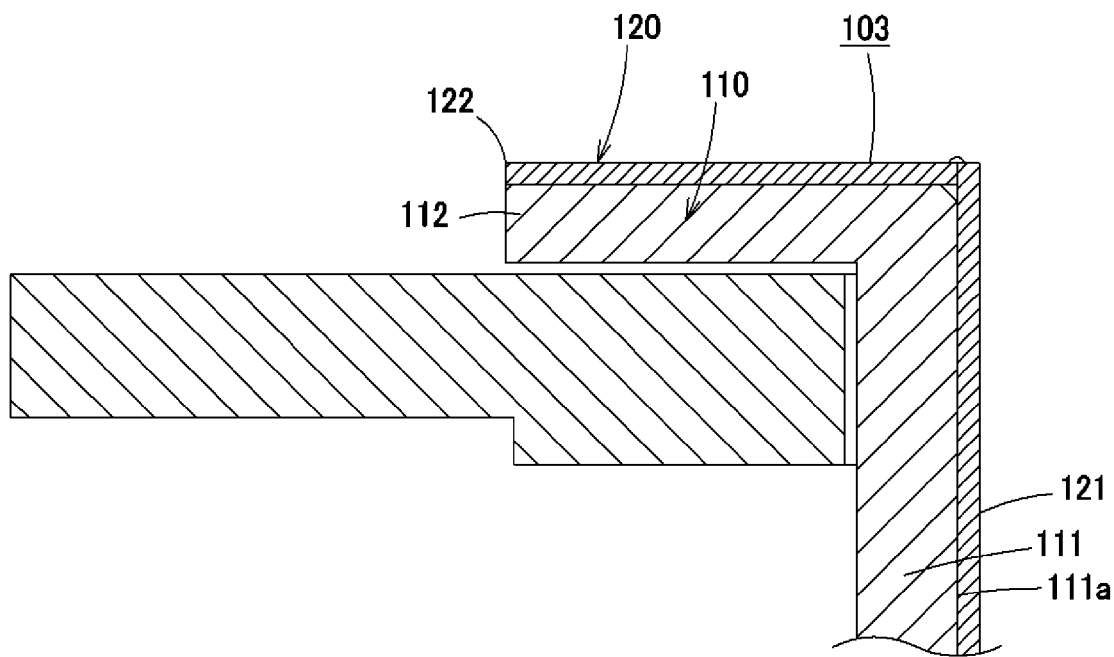
FIG. 4 is a sectional view illustrating a conventional lining structure.

Next, the insertion tube 3 for adding a chemical with the lining structure 1 according to the present invention as illustrated in FIGS. 1 and 2 and the insertion tube 103 for adding a chemical with the conventional lining structure as illustrated in FIGS. 3 and 4 were respectively observed for every half a year to check existence of a crack in the lining member. The conventional lining structure has a structure in which the flange lining section 122 of the lining member 120 is explosively welded to the flange section 112 of the base material member 110 and is joined to the tube section lining section 121, and the tube section lining section 121 and the flange lining section 122 are joined substantially orthogonally.

Then, a minute crack was always found in the lining member 120 of the insertion tube 103 for adding a chemical with the conventional lining structure at periodic inspection of every half a year, and replacement of the insertion tube 103 for adding a chemical was required every time. On the other hand, the crack did not occur in the lining member 20 of the insertion tube 3 for adding a chemical with the lining structure 1 according to the present invention for three years after being adopted.

[2. Description of Effects of Lining Structure]

As described above, according to the lining structure 1, the chamfer section 13 is formed on the flange section 12, and the tube section lining section 21 is protruded to the same height as the flat upper surface 22*a* of the flange lining section 22. Further, the flange lining section 22 has the curved surface section 24 protruded toward a base material member 10 side on the chamfer section 13 and welded with the protruding section 21*b* of the tube section lining section 21. Accordingly, even when the insertion tube 3 for adding a chemical is thermally expanded under high temperature and high pressure, the lining member 20 having a small coefficient of thermal expansion can follow the expansion and can absorb a difference in thermal expansion even in a reaction under high temperature and high pressure. Further, according to the lining structure 1, even when the lining member 20 formed of the lining material having a coefficient of expansion smaller than that of the metal base material of the base material member 10 is used in an environment where high temperature and high pressure and normal temperature and normal pressure are repeated, occurrence of stress concentration in which a crack occurs in the lining member 20 can be prevented.

Therefore, the lining structure 1 can prevent occurrence of a crack in the lining member 20 than before. Accordingly, the lining structure 1 can suppress a risk of jetting out high pressure steam or a chemical and a risk, such as a loss caused by stopping a production facility due to replacement work or repair work of the insertion tube for adding a chemical accompanied by the occurrence of the crack in the lining member 20.

Further, according to the lining structure 1, since the explosive welding is not needed in the flange section 12 of the base material member 10 as before, a manufacturing step can be more simplified than before.

[3. Description of Variation of Lining Structure]

Incidentally, as illustrated in FIG. 2, when a width from a part of the flange section 12 abutting the inner surface of the tube section 11 to the flange section 12 is W, a width range w of the chamfer section 13 of the base material member 10 may be set within a range from 1/4 W to 1/2 W. When the width range is smaller than or equal to 1/2 W, strength of the base material member 10 can be sufficiently secured during machining or during installation, and when the width range is greater than or equal to 1/4 W, the curved surface section 24 can be made large to a degree that alleviation of stress can be sufficiently secured.

Further, as illustrated in FIG. 2, when a thickness of the flange section 12 is D, a depth ranged of the chamfer section 13 of the base material member 10 may be set within a range from 1/3 D to 1/2 D. Incidentally, when the depth range is smaller than or equal to 1/2 D, strength of the base material member 10 can be sufficiently secured during machining or during installation, and that, when the depth range is greater than or equal to 1/3 D, the curved surface section 24 can be made large to a degree that alleviation of stress can be sufficiently secured.

Further, the reaction vessel 2 should not be limited to the one for leaching nickel from nickel oxide ore slurry, and can be the one for leaching the other metal from another slurry. Further, the insertion tube 3 for adding a chemical should not be limited to the one for adding an acidic chemical to the reaction vessel, and can be the one for adding another chemical to the reaction vessel.

REFERENCE SIGNS LIST

1: lining structure
2: reaction vessel
3: insertion tube for adding a chemical
10: base material
11: tube section
12: flange section
12a: flat section
13: chamfer section
13a: slant surface
20: lining member
21: cylindrical tube section lining section
21a: one end section
21b: protruding section
22: flange lining section
22a: flat upper surface
23: flat section
24: curved surface section
24a: first curved surface section
24b: second curved surface section
102: autoclave
103: insertion tube for adding a chemical
110: base material member
111: tube section
111a: inner surface
112: flange section
120: lining member
121: cylindrical tube section lining section
122: flange lining section

The invention claimed is:

1. A lining structure of a lining member provided on a base material of an insertion tube used for adding a chemical to a reaction vessel for leaching under high temperature and high pressure, wherein
the base material has a tube section and a flange section,
the lining member is provided on the base material and formed of a material different from the base material, and the lining member has a tube section lining section provided on the tube section and a flange lining section provided on the flange section,
a chamfer section is formed on the flange section,
the tube section lining section is protruded to the same height as a flat surface of the flange lining section, and
the flange lining section has a curved surface section protruded toward the base material side on the chamfer section and is welded to a protruding section of the tube section lining section that protrudes from a slant surface of the chamfer section.

2. The lining structure according to claim 1, wherein when a width from a part of the flange section abutting an inner surface of the tube section to the flange section is W, a width range of the chamfer section is within a range from 1/4 W to 1/2 W, and when a thickness of the flange section is D, a depth range of the chamfer section is within a range from 1/3 D to 1/2 D.

3. The lining structure according to claim 1, wherein by adding an acidic chemical to the reaction vessel, the reaction vessel at least leaches nickel from nickel oxide ore slurry.

* * * * *